US011324234B2

(12) United States Patent
Silva et al.

(10) Patent No.: US 11,324,234 B2
(45) Date of Patent: May 10, 2022

(54) METHOD FOR RAISING ANIMALS

(71) Applicant: Evonik Operations GmbH, Essen (DE)

(72) Inventors: Amelia Claudia Silva, Hanau (DE); Stefan Eils, Gründau (DE); Horst Priefert, Ostbevern (DE); Christian Rabe, Grossostheim (DE)

(73) Assignee: Evonik Operations GmbH, Essen (DE)

( * ) Notice: Subject to any disclaimer, the term of this patent is extended or adjusted under 35 U.S.C. 154(b) by 305 days.

(21) Appl. No.: 15/516,023

(22) PCT Filed: Sep. 22, 2015

(86) PCT No.: PCT/EP2015/071689
§ 371 (c)(1),
(2) Date: Mar. 31, 2017

(87) PCT Pub. No.: WO2016/050556
PCT Pub. Date: Apr. 7, 2016

(65) Prior Publication Data
US 2017/0290356 A1    Oct. 12, 2017

(30) Foreign Application Priority Data
Oct. 2, 2014   (EP) .................................. 14187467

(51) Int. Cl.
A23K 10/12 (2016.01)
A23K 10/16 (2016.01)
(Continued)

(52) U.S. Cl.
CPC .............. A23K 10/12 (2016.05); A23K 10/16 (2016.05); A23K 20/158 (2016.05);
(Continued)

(58) Field of Classification Search
CPC ...... A23K 50/80; A23K 20/158; A23K 10/12; A23K 10/16; A23K 20/163; A23K 40/25; A23K 50/00; A23K 40/30; A23K 10/18; A23K 40/10; A23K 20/10; A23K 50/40; A23K 10/00; A23K 10/20; A23K 10/22; A23K 1/007; A23K 1/164; A23K 1/188; A23K 20/00; A23K 20/28; A23K 3/005; A23K 30/20; A23K 10/37; A23K 50/10; A23K 20/111; A23K 20/121; A23K 50/75; A23K 20/147; A23K 20/174; A23K 30/00; A23K 50/30; C12P 7/6427; C12P 7/6472; C12P 7/6463; C12P 7/649; C12P 19/04; C12P 7/64; C12P 19/26; C12P 7/6409; C12P 33/00; C12P 7/22; C12P 1/00; C12P 19/34; C12P 7/6418; C12P 13/04; A23V 2002/00; A23V 2200/02; A23V 2200/3262; A23V 2200/328; A23V 2200/332; A23V 2250/202; A23V 2200/222; A23V 2200/326; A23V 2250/1868; A23V 2250/187; A23V 2250/1882; A23V 2250/5422; A23V 2300/10; A23V 2300/14; A23V 2250/708; C12N 1/12; C12N 15/79; C12N 1/10; C12N 15/01; C12N 15/52; C12N 15/8207; C12N 1/00; C12N 1/22; C12N 9/0071; C12N 9/1029; C12N 9/2405; C12N 9/93; C12N 1/005; C12N 1/20; C12N 1/34; C12N 15/09; C12N 9/1007; C12N 15/8201; C12N 15/8247; C12N 9/0083; C12N 1/36; A61K 31/202; A61K 2300/00; A61K 2800/10; A61K 31/20; A61K 8/361; A61K 31/722; A61K 31/201; A61K 35/66; A61K 35/68; A61K 36/02; A61K 8/99; A61K 9/4875; A61K 2035/11; A61K 2800/74; A61K 36/05; A61K 8/30; A61K 8/37; A61K 8/92; A61K 8/97; A61K 9/167; A61K 31/198; A61K 35/00; A61K 36/00; A61K 8/44; A61K 8/9728; A61K 31/355; A23L 2/52; A23L 33/115; A23L 33/12; A23L 33/10; A23L 33/40; A23L 29/065; A23L 33/135; A23L 31/00; A23L 3/40; A23L 3/50; A23L 2/66; A23L 33/185; A23L 3/349; A23L 3/3544; Y02A 40/818; Y02A 50/473; A23D 9/00; A23D 9/007; A23D 7/001; A23D 7/005; A23D 7/0053;
(Continued)

(56) References Cited

U.S. PATENT DOCUMENTS 2,123,134 A   7/1938 Cowgill
2,177,031 A   10/1939 Tanner
(Continued)

FOREIGN PATENT DOCUMENTS

AU    771 809 B2    6/2001
CA    2 579 516     10/1997
(Continued)

OTHER PUBLICATIONS

Non Final Office Action for copending U.S. Appl. No. 15/516,044, dated Mar. 27, 2019.
Chang, K.J.L., "New Australian thraustochytrids: A Renewable Source of Biofuels, Omega-3 Oils and other Bioproducts," Thesis; University of Tasmania; (Aug. 2013).
Restriction Requirement for copending U.S. Appl. No. 15/516,024, dated Mar. 4, 2019.
(Continued)

Primary Examiner — Kade Ariani
(74) Attorney, Agent, or Firm — Law Office of: Michael A. Sanzo, LLC

(57) ABSTRACT

According to the invention, it was found that a feedstuff containing an *Aurantiochytrium* biomass brings about a significant increase in growth in fish.

19 Claims, No Drawings

(51) Int. Cl.
| | |
|---|---|
| *A23K 20/158* | (2016.01) |
| *A23K 50/80* | (2016.01) |
| *A23K 40/30* | (2016.01) |
| *A23K 20/163* | (2016.01) |
| *A23K 40/25* | (2016.01) |

(52) U.S. Cl.
CPC ............ *A23K 20/163* (2016.05); *A23K 40/25* (2016.05); *A23K 40/30* (2016.05); *A23K 50/80* (2016.05)

(58) Field of Classification Search
CPC .......... A23D 7/0056; A23D 9/02; A23D 9/06; C11B 1/10; C11B 1/00; C11B 3/04; C11B 5/00; C11B 1/025; C11B 1/04; C11B 1/108; C11B 1/12; C11B 1/14; C11B 3/16; C11B 7/0025; C11B 7/005; C11B 5/0035; Y02E 50/13; Y02E 50/10; A61Q 19/00; A61Q 17/04; A61Q 19/08; C12R 1/89; C12R 1/00; C12R 1/90; C12R 1/465; A21D 8/04; A21D 2/165; A23C 9/1528; A23P 10/30; A23P 10/22; C07J 9/00; C10L 1/026; C10L 2200/0476; C10L 2200/0484; C12Y 114/19006; C12Y 302/01026; C12Y 302/01048; C12Y 604/00; C12Y 201/01041; C08B 37/0003; C08B 37/003; C12Q 1/37; C12Q 3/00; C12Q 1/689; G01N 1/4044; G01N 21/3563; G01N 21/359; G01N 2333/96477; G01N 33/02; Y10S 435/911; C07C 401/00; C07C 249/14; C07C 251/20; C07C 2601/14; C07C 2601/16; C07C 2602/24; C07C 53/126; C07C 57/03; B01J 19/123; B01J 2219/12; A23J 1/008; A23J 1/009; A23J 1/18; A23J 3/20; A23J 3/347; C10G 3/00; C11C 1/045; C11C 3/00; A61P 3/02; A61P 39/06; A61P 3/04; A61P 3/06; A61P 3/10; A61P 25/00; A61P 29/00; A61P 9/00; A61P 3/08; A61P 43/00; A61P 5/50; Y02P 30/20; C07D 311/20; C07D 311/22; C07D 311/58; C07D 311/70; C07D 493/08
See application file for complete search history.

(56) References Cited

U.S. PATENT DOCUMENTS

| | | |
|---|---|---|
| 2,513,369 A | 7/1950 | Shaw |
| 3,257,737 A | 6/1966 | Thomas |
| 3,257,738 A | 6/1966 | Margittai et al. |
| 3,437,489 A | 4/1969 | Seiji et al. |
| 3,773,527 A | 11/1973 | Ruggerone |
| 3,920,815 A | 11/1975 | Harvey et al. |
| 4,160,040 A | 7/1979 | Luca et al. |
| 4,209,538 A | 6/1980 | Woodruff |
| 4,228,197 A | 10/1980 | Means |
| 4,335,150 A | 6/1982 | Hosaka et al. |
| 4,592,762 A | 6/1986 | Babu et al. |
| 4,683,139 A | 7/1987 | Cheng |
| 5,113,597 A | 5/1992 | Sylla |
| 5,130,242 A | 7/1992 | Barclay |
| 5,298,271 A | 3/1994 | Takashina et al. |
| 5,340,594 A | 8/1994 | Barclay |
| 5,340,742 A | 8/1994 | Barclay |
| 5,434,183 A | 7/1995 | Larsson-Backstrom |
| 5,518,918 A | 5/1996 | Barclay |
| 5,567,732 A | 10/1996 | Kyle et al. |
| 5,574,065 A | 11/1996 | Trimbo |
| 5,622,710 A | 4/1997 | Binder et al. |
| 5,656,319 A | 8/1997 | Barclay |
| 5,698,244 A | 12/1997 | Barclay |
| 5,700,506 A | 12/1997 | Mudahar |
| 5,700,837 A | 12/1997 | Trimbo |
| 5,840,358 A | 11/1998 | Hofler et al. |
| 6,068,874 A | 5/2000 | Grocholski |
| 6,117,905 A | 9/2000 | Higashiyama et al. |
| 6,158,147 A | 12/2000 | Smith et al. |
| 6,166,230 A | 12/2000 | Bijl et al. |
| 6,248,909 B1 | 6/2001 | Akimoto et al. |
| 6,255,505 B1 | 7/2001 | Bijl et al. |
| 6,326,037 B1 | 12/2001 | Mann et al. |
| 6,372,460 B1 | 4/2002 | Gladue et al. |
| 6,410,281 B1 | 6/2002 | Barclay |
| 6,441,208 B2 | 8/2002 | Bijl et al. |
| 6,451,567 B1 | 9/2002 | Barclay |
| 6,602,690 B2 | 8/2003 | Kawashima et al. |
| 6,607,900 B2 | 8/2003 | Bailey et al. |
| 6,727,373 B2 | 4/2004 | Bijl et al. |
| 6,812,009 B2 | 11/2004 | Gladue et al. |
| 6,977,167 B2 | 12/2005 | Barclay |
| 7,067,145 B2 | 6/2006 | Place et al. |
| 7,259,006 B2 | 8/2007 | Komazawa et al. |
| 7,381,558 B2 | 6/2008 | Barclay |
| 7,470,527 B2 | 12/2008 | Streekstra et al. |
| 7,514,096 B2 | 4/2009 | Haraldsson et al. |
| 7,514,244 B2 | 4/2009 | Tanaka et al. |
| 7,579,174 B2 | 8/2009 | Bailey et al. |
| 7,709,236 B2 | 5/2010 | Akimoto et al. |
| 7,723,386 B2 | 5/2010 | Akimoto et al. |
| 7,732,170 B2 | 6/2010 | Bailey et al. |
| 7,847,113 B2 | 12/2010 | Kawashima et al. |
| 7,863,026 B2 | 1/2011 | Komazawa et al. |
| 7,910,604 B2 | 3/2011 | Vasquez-Anon et al. |
| 7,935,365 B2 | 5/2011 | Dror et al. |
| 8,030,348 B2 | 10/2011 | Sampalis |
| 8,052,992 B2 | 11/2011 | Dror et al. |
| 8,124,384 B2 | 2/2012 | Bailey et al. |
| 8,124,385 B2 | 2/2012 | Bailey et al. |
| 8,129,172 B2 | 3/2012 | Barclay |
| 8,143,310 B2 | 3/2012 | Wang |
| 8,163,515 B2 | 4/2012 | Burja et al. |
| 8,187,846 B2 | 5/2012 | Bailey et al. |
| 8,207,363 B2 | 6/2012 | Apt et al. |
| 8,216,812 B2 | 7/2012 | Bailey et al. |
| 8,217,151 B2 | 7/2012 | Schaap et al. |
| 8,232,090 B2 | 7/2012 | Kallenmareth |
| 8,236,854 B2 | 8/2012 | Akimoto et al. |
| 8,241,868 B2 | 8/2012 | Higashiyama et al. |
| 8,278,351 B2 | 10/2012 | Sampalis |
| 8,288,133 B2 | 10/2012 | Bailey et al. |
| 8,288,134 B2 | 10/2012 | Bailey et al. |
| 8,334,363 B2 | 12/2012 | Hurd et al. |
| 8,343,753 B2 | 1/2013 | Chilton et al. |
| 8,367,774 B2 | 2/2013 | Frank |
| 8,420,349 B2 | 4/2013 | Kralovec et al. |
| 8,900,831 B2 | 12/2014 | Rusing et al. |
| 8,945,886 B2 | 2/2015 | Katano et al. |
| 8,999,663 B2 | 4/2015 | Avgousti et al. |
| 9,045,785 B2 | 6/2015 | Pfeifer et al. |
| 9,072,311 B2 | 7/2015 | Harel et al. |
| 9,101,151 B2 | 8/2015 | Kobzeff et al. |
| 9,414,612 B2 | 8/2016 | Apt et al. |
| 9,493,798 B2 | 11/2016 | Higashiyama et al. |
| 9,649,609 B2 | 5/2017 | Alt et al. |
| 9,848,623 B2 | 12/2017 | Bailey et al. |
| 10,531,679 B2 | 1/2020 | Rudinger et al. |
| 10,619,175 B2 | 4/2020 | Rabe |
| 10,842,174 B2 | 11/2020 | Durhuus |
| 2002/0110582 A1 | 8/2002 | Place et al. |
| 2003/0143659 A1 | 7/2003 | Bijl et al. |
| 2003/0170371 A1 | 9/2003 | Jobe et al. |
| 2005/0118208 A1 | 6/2005 | Bewert |
| 2005/0129739 A1 | 6/2005 | Kohn et al. |
| 2005/0202148 A1 | 9/2005 | Streekstra et al. |
| 2005/0287263 A1 | 12/2005 | Mayer |
| 2006/0051484 A1 | 3/2006 | Yamaguchi et al. |
| 2006/0068019 A1 | 3/2006 | Daiziel |

(56) References Cited

U.S. PATENT DOCUMENTS

| | | |
|---|---|---|
| 2006/0094089 A1 | 5/2006 | Barclay |
| 2006/0127531 A1 | 6/2006 | Jobe |
| 2006/0160203 A1 | 7/2006 | Barclay |
| 2006/0188969 A1 | 8/2006 | Barclay |
| 2006/0265766 A1 | 11/2006 | Kyle et al. |
| 2006/0286205 A1 | 12/2006 | Fichtali et al. |
| 2007/0032383 A1 | 2/2007 | Newell |
| 2007/0082008 A1 | 4/2007 | Harel et al. |
| 2007/0092955 A1 | 4/2007 | De Laat et al. |
| 2007/0172540 A1 | 7/2007 | Neece et al. |
| 2007/0243307 A1 | 10/2007 | Abril et al. |
| 2007/0244192 A1 | 10/2007 | Metz |
| 2007/0248738 A1 | 10/2007 | Abril et al. |
| 2007/0248739 A1 | 10/2007 | Abril et al. |
| 2008/0026128 A1 | 1/2008 | Yamaguchi et al. |
| 2008/0032381 A1 | 2/2008 | Bailey et al. |
| 2008/0038800 A1 | 2/2008 | Ruecker et al. |
| 2008/0096964 A1 | 4/2008 | Subramanian et al. |
| 2008/0166780 A1 | 7/2008 | Barclay |
| 2008/0199923 A1 | 8/2008 | Barclay |
| 2008/0254177 A1 | 10/2008 | Lin et al. |
| 2009/0004219 A1 | 1/2009 | Kallenmareth et al. |
| 2009/0053342 A1 | 2/2009 | Streekstra et al. |
| 2009/0064567 A1 | 3/2009 | Lippmeier et al. |
| 2009/0136637 A1 | 5/2009 | Janssen et al. |
| 2009/0162892 A1 | 6/2009 | Pompejus et al. |
| 2009/0182050 A1 | 7/2009 | Barrow et al. |
| 2009/0202672 A1 | 8/2009 | Hartnell |
| 2009/0226571 A1 | 9/2009 | Freyer |
| 2009/0263889 A1 | 10/2009 | Wumpelmann |
| 2009/0274817 A1 | 11/2009 | Yamaguchi et al. |
| 2009/0285969 A1 | 11/2009 | Schaap et al. |
| 2010/0010088 A1 | 1/2010 | Chilton et al. |
| 2010/0086638 A1 | 4/2010 | Kyle et al. |
| 2010/0151112 A1 | 6/2010 | Franklin et al. |
| 2010/0159512 A1 | 6/2010 | Onose |
| 2010/0239712 A1 | 9/2010 | Brooks et al. |
| 2010/0266681 A1 | 10/2010 | Holmeide |
| 2010/0285105 A1 | 11/2010 | Radianingtyas |
| 2010/0297292 A1 | 11/2010 | Brooks et al. |
| 2010/0297295 A1 | 11/2010 | Brooks et al. |
| 2010/0297323 A1 | 11/2010 | Brooks et al. |
| 2010/0297331 A1 | 11/2010 | Brooks et al. |
| 2010/0303961 A1 | 12/2010 | Brooks et al. |
| 2010/0303989 A1 | 12/2010 | Brooks et al. |
| 2010/0303990 A1 | 12/2010 | Brooks et al. |
| 2011/0054029 A1 | 3/2011 | Kuhrts |
| 2011/0086128 A1 | 4/2011 | Abril et al. |
| 2011/0117068 A1 | 5/2011 | Lang et al. |
| 2011/0129884 A1 | 6/2011 | Luy |
| 2011/0166228 A1 | 7/2011 | Holmeide et al. |
| 2011/0177031 A1 | 7/2011 | Apt et al. |
| 2011/0189228 A1 | 8/2011 | Bayne et al. |
| 2011/0195448 A1 | 8/2011 | Lippmeier et al. |
| 2011/0195449 A1 | 8/2011 | Lippmeier et al. |
| 2011/0203168 A1 | 8/2011 | Franklin et al. |
| 2011/0258915 A1 | 10/2011 | Subhadra |
| 2011/0287158 A1 | 11/2011 | Yamaguchi et al. |
| 2012/0213905 A1 | 8/2012 | Nichols |
| 2012/0237578 A1 | 9/2012 | Lei et al. |
| 2013/0045226 A1 | 2/2013 | Avgousti et al. |
| 2013/0046020 A1 | 2/2013 | Liang et al. |
| 2013/0046105 A1 | 2/2013 | Avgousti et al. |
| 2013/0172590 A1 | 7/2013 | Pfeifer et al. |
| 2013/0302470 A1 | 11/2013 | Becker et al. |
| 2013/0344546 A1* | 12/2013 | Burja .................. A23K 20/158 435/134 |
| 2014/0017742 A1 | 1/2014 | Streekstra et al. |
| 2015/0044356 A1 | 2/2015 | Bootsma et al. |
| 2015/0223492 A1 | 8/2015 | Pfeifer et al. |
| 2016/0066600 A1 | 3/2016 | Barrows |
| 2016/0183565 A1 | 6/2016 | Rudinger et al. |
| 2016/0227816 A1 | 8/2016 | Alt et al. |
| 2016/0249642 A1 | 9/2016 | Rabe et al. |
| 2016/0255862 A1 | 9/2016 | Oelmann et al. |
| 2017/0121742 A1 | 5/2017 | Aijawi et al. |
| 2017/0245523 A1 | 8/2017 | Pfeifer et al. |
| 2017/0295823 A1 | 10/2017 | Rabe et al. |
| 2017/0295824 A1 | 10/2017 | Priefert et al. |
| 2017/0298318 A1 | 10/2017 | Rabe et al. |
| 2017/0303561 A1 | 10/2017 | Durhuus et al. |
| 2017/0306365 A1 | 10/2017 | Rabe et al. |
| 2019/0249108 A1 | 8/2019 | Cherinko et al. |
| 2019/0300818 A1 | 10/2019 | Bärz |
| 2019/0323043 A1 | 10/2019 | Diehl |
| 2020/0015500 A1 | 1/2020 | De Vriendt |
| 2020/0231896 A1 | 7/2020 | Bahl |
| 2020/0231898 A1 | 7/2020 | Bärz |
| 2020/0339498 A1 | 10/2020 | Heining |
| 2020/0362373 A1 | 11/2020 | Leininger et al. |
| 2020/0383353 A1 | 12/2020 | Wilson et al. |
| 2020/0404938 A1 | 12/2020 | Heining et al. |
| 2021/0017467 A1 | 1/2021 | Adugna et al. |
| 2021/0024966 A1 | 1/2021 | Heining et al. |
| 2021/0163842 A1 | 6/2021 | Heining et al. |
| 2021/0171991 A1 | 6/2021 | Burja et al. |
| 2021/0207056 A1 | 7/2021 | Heining et al. |

FOREIGN PATENT DOCUMENTS

| | | |
|---|---|---|
| CH | 646 729 | 12/1984 |
| CN | 101 999 552 | 4/2011 |
| CN | 102 687 810 | 9/2012 |
| CN | CN 102687810 | 9/2012 |
| CN | 102919512 | 2/2013 |
| CN | 103 070 293 | 5/2013 |
| CN | 103070293 | 5/2013 |
| CN | 103 385 390 | 11/2013 |
| CN | 103385390 | 11/2013 |
| DE | 10 2006 026 328 | 1/2008 |
| EP | 0 671 125 | 9/1995 |
| GB | 1 397 410 | 6/1975 |
| GB | 1 560 478 | 10/1976 |
| GB | 2 324 701 | 11/1998 |
| GB | 2 437 909 | 11/2007 |
| WO | WO 91/07498 | 5/1991 |
| WO | WO 94/08467 | 4/1994 |
| WO | WO 97/36996 | 10/1997 |
| WO | WO 97/37032 | 10/1997 |
| WO | WO 98/49904 | 11/1998 |
| WO | WO 01/54510 | 8/2001 |
| WO | WO 02/00035 | 1/2002 |
| WO | WO 2006/085672 | 8/2006 |
| WO | WO 2006/124598 | 11/2006 |
| WO | WO 2006/136539 | 12/2006 |
| WO | WO 2007/074479 | 7/2007 |
| WO | WO 2007/117511 | 10/2007 |
| WO | WO 2008/019887 | 2/2008 |
| WO | WO 2008/049512 | 5/2008 |
| WO | WO 2008/148873 | 12/2008 |
| WO | WO 2010/090979 | 8/2010 |
| WO | WO 2010/120923 | 10/2010 |
| WO | WO 2010/128312 | 11/2010 |
| WO | WO 2011/006261 | 1/2011 |
| WO | WO 2013/022485 | 2/2013 |
| WO | WO 2014/045191 | 3/2014 |
| WO | WO 2014/122087 | 8/2014 |
| WO | WO 2014/122092 | 8/2014 |

OTHER PUBLICATIONS

Non Final Office Action for copending U.S. Appl. No. 15/516,058, dated Mar. 12, 2019.

English language translation International Search Report for PCT/EP2015/071689 filed Sep. 22, 2015.

English language translation of the Written Opinion of the International Searching Authority for PCT/EP2015/071689 filed Sep. 22, 2015.

English language translation of the International Preliminary Report on Patentability for PCT/EP2015/071689 filed Sep. 22, 2015.

European Search Report for EP 14 18 7467 filed Oct. 2, 2014.

(56) References Cited

OTHER PUBLICATIONS

English translation of the International Search Report for PCT/EP2015/071666 filed Sep. 22, 2015 for copending U.S. Appl. No. 15/516,022.
English language translation of the Written Opinion of the International Searching Authority for PCT/EP2015/071666 filed Sep. 22, 2015 for copending U.S. Appl. No. 15/516,022.
English language translation of the International Preliminary Report on Patentability for PCT/EP2015/071666 filed Sep. 22, 2015 for copending U.S. Appl. No. 15/516,022.
European Search Report with partial machine translation for EP 14 18 7485 filed Oct. 2, 2014 for copending U.S. Appl. No. 15/516,022.
English translation of the International Search Report for PCT/EP2015/071707 filed Sep. 22, 2015 for copending U.S. Appl. No. 15/516,044.
English language translation of the Written Opinion of the International Searching Authority for PCT/EP2015/071707 filed Sep. 22, 2015 for copending U.S. Appl. No. 15/516,044.
English language translation of the International Preliminary Report on Patentability for PCT/EP2015/071707 filed Sep. 22, 2015 for copending U.S. Appl. No. 15/516,044.
European Search Report with partial machine translation for EP 14 18 7479 filed Oct. 2, 2014 for copending U.S. Appl. No. 15/516,044.
English translation of the International Search Report for PCT/EP2015/071635 filed Sep. 22, 2015 for copending U.S. Appl. No. 15/516,024.
English language translation of the Written Opinion of the International Searching Authority for PCT/EP2015/071635 filed Sep. 22, 2015 for copending U.S. Appl. No. 15/516,024.
English language translation of the International Preliminary Report on Patentability for PCT/EP2015/071635 filed Sep. 22, 2015 for copending U.S. Appl. No. 15/516,024.
European Search Report with partial machine translation for EP 14 18 7471 filed Oct. 2, 2014 for copending U.S. Appl. No. 15/516,024.
English translation of the International Search Report for PCT/EP2015/072824 filed Oct. 2, 2015 for copending U.S. Appl. No. 15/516,058.
English language translation of the Written Opinion of the International Searching Authority for PCT/EP2015/072824 filed Oct. 2, 2015 for copending U.S. Appl. No. 15/516,058.
English language translation of the International Preliminary Report on Patentability for PCT/EP2015/072824 filed Oct. 2, 2015 for copending U.S. Appl. No. 15/516,058.
European Search Report with partial machine translation for EP 14 18 7471 filed Oct. 2, 2014 for copending U.S. Appl. No. 15/516,058.
Asha, et al., "Effect of sea weed, sea grass and powdered algae in rearing the hatchery produced juveniles of *Holothuria* (metriatyla) *scabra*, jeager," *Proceedings of the National Symposium on Recent Trends in Fisheries*, (2004).
Baeverfjord, et al., "Low feed pellet water stability and fluctuating water salinity cause separation and accumulation of dietary oil in the stomach of rainbow trout (*Oncorhynchus* mykiss)," *Aquaculture* 261(4):1335-1345 (Dec. 2006).
Carter, et al., "Potential of Thraustochytrids to Partially Replace Fish Oil in Atlantic Salmon Feeds," *Marine Biotechnology* 5:480-492 (Oct. 2002).
Hondo, et al.,"*Schizochytrium limacinum* sp. nov., a new thraustochytrid from a mangrove area in the west Pacific Ocean," *Mycological Research* 102(4):439-448 (Apr. 1998).
Jain, et al., "Extracellular Polysaccharide Production by Thraustochytrid Protists," *Marine Biotechnology* 7:184-192 (published online May 2005).
Miller, et al., Replacement of fish oil with thraustochytrid *Schizochytrium* sp. L oil in Atlantic salmon parr (*Salmo* salar L) diets, *Comparative Biochemistry and Physiology, Part A* 148:382-392 (available online May 2007).
Nakahara, et al., "Production of Docosahexaenoic and Docosapentaenioc Acids by *Schizochytrium* sp. Isolated from Yap Islands," *Journal of American Oil Chemists' Society* 73(11):1421-1425 (Nov. 1996).

Prabu, et al., "Effect of sodium sulphate salinity for production of docosahexaenoic acid (DHA) by *Thraustochytrids aureum* RAK-21," *Asian Biomedicine* 6(5):693-701 (Oct. 2012).
Taxonomy Browser: *Aurantiochytrium limacinum*, taxonomy ID: 87102 (Jan. 2015).
XP-002721747; Database WPI Thomson Scientific, London GB; (Sep. 2013).
XP-002534705; Degussa: "Product Information SIPERNAT D17," Internet citation (Sep. 2004).
U.S. Appl. No. 14/904,665, filed Jan. 12, 2016, US-2016/0183565, Jun. 30, 2016, Rudinger.
U.S. Appl. No. 15/027,429, filed Apr. 5, 2016, US-2016/0249642, Sep. 1, 2016, Rabe.
U.S. Appl. No. 15/516,038, filed Mar. 31, 2017, Rabe.
U.S. Appl. No. 15/516,024, filed Mar. 31, 2017, Priefert.
U.S. Appl. No. 15/516,044, filed Mar. 31, 2017, Rabe.
U.S. Appl. No. 15/516,022, filed Mar. 31, 2017, Rabe.
U.S. Appl. No. 15/516,058, filed Mar. 31, 2017, Durhuus.
Restriction Requirement for copending U.S. Appl. No. 15/516,058, dated Oct. 12, 2018.
Response to Restriction Requirement for copending U.S. Appl. No. 15/516,058, filed Dec. 12, 2018.
Amendment to accompany Response to Restriction Requirement for copending U.S. Appl. No. 15/516,058, filed Dec. 12, 2018.
Restriction Requirement for copending U.S. Appl. No. 15/516,044, dated Oct. 25, 2018.
Response to Restriction Requirement for copending U.S. Appl. No. 15/516,044, filed Dec. 25, 2018.
Amendment to accompany Response to Restriction Requirement for copending U.S. Appl. No. 15/516,044, filed Dec. 25, 2018.
Suomalainen, et al., "The Fatty Acid Composition of Baker's and Brewer's Yeast," *Chem. Phys. Lipids* 2:296-315 (1968).
Technicial Information 1251 (2017) http://www.sipernat.com/sites/lists/RE/DocumentsSI/TI-1251-AEROSIL-and-SIPERNAT-Silica-Versatile-Raw-Materials-for-Personal-Care-Formulations-EN.pdf download Apr. 11, 2018 (Year: 2017).
Chen, et al., "Whole cell algae powder used for increasing docosahexanoic acid content in milk of high-yielding mammal, comprises docohexanoic acid containing algae cell slurry, emulsifier, antioxidant, filler, packaging material, dispersant and water," WPI/THOMPSON, Bd. 2011, Nr. 44, (Apr. 6, 2011); XP-002721747.
Uemura, "Synthesis and production of unsaturated and polyunsaturated fatty acids in yeast: current state and perspectives," *Appl. Microbiol. Biotechnol*. 95:1-12 (May 2012).
Visentainer, et al., "Influence of diets enriched with flaxseed oil on the α-linolenic, eicosapentaenoic and docosahexaenoic fatty acid in Nile tilapia (*Oreochromis niloticus*)," *Food Chemistry* 90:557-560 (May 2005).
Response to Restriction Requirement for copending U.S. Appl. No. 15/516,024, filed May 4, 2019.
Amendment and Response to Non Final Office Action for copending U.S. Appl. No. 15/516,058, filed Jun. 22, 2019.
Restriction Requirement for copending U.S. Appl. No. 15/516,022, dated Jun. 26, 2019.
Keleb, et al., "Continous twin screw extrusion for the wet granulation of lactose," *International Journal of Pharmaceutics* 239:69-80 (2002).
Hammond, et al., "Safety Assessment of DHA-Rich Microalgae from *Schizochytrium* sp.," *Regulatory Toxicology and Pharmacology* 33(2):192-204 (Apr. 2001).
Response to Restriction Requirement filed Aug. 16, 2019, for copending U.S. Appl. No. 15/516,022.
Amendment and Response to Final Rejection filed Dec. 29, 2019, for copending U.S. Appl. No. 15/516,058.
Notice of Appeal filed Dec. 29, 2019, for copending U.S. Appl. No. 15/516,058.
Notice of Allowance dated Nov. 26, 2019, for copending U.S. Appl. No. 15/516,044.
Amendment Under Rule 312 filed Dec. 16, 2019, for copending U.S. Appl. No. 15/516,044.
Amendment and Response to Office Action filed Dec. 16, 2019, for copending U.S. Appl. No. 15/516,024.

(56) References Cited

OTHER PUBLICATIONS

Amendment and Response to Office Action filed Jan. 9, 2020, for copending U.S. Appl. No. 15/516,022.
Amendment and Response to Office Action filed Aug. 10, 2019 for copending U.S. Appl. No. 15/516,044.
Office Action dated Aug. 16, 2019 for copending U.S. Appl. No. 15/516,024.
Final Office Action dated Aug. 29, 2019 for copending U.S. Appl. No. 15/516,058.
Office Action dated Sep. 17, 2019 for copending U.S. Appl. No. 15/516,022.
Final Rejection dated Feb. 13, 2020 for copending U.S. Appl. No. 15/516,022.
Amendment & Response to Accompany RCE filed Jul. 13, 2020 for copending U.S. Appl. No. 15/516,022.
Request for Continued Examination filed Jul. 13, 2020 for copending U.S. Appl. No. 15/516,022.
Final Rejection dated Mar. 19, 2020 for copending U.S. Appl. No. 15/516,024.
Appeal Brief filed Mar. 30, 2020 for copending U.S. Appl. No. 15/516,058.
Advisory Action dated Apr. 6, 2020 for copending U.S. Appl. No. 15/516,058.
Notice of Allowance dated Jun. 4, 2020 for copending U.S. Appl. No. 15/516,058.
Request for Continued Examination filed Jun. 18, 2020 for copending U.S. Appl. No. 15/516,058.
Notice of Allowance dated Jul. 17, 2020 for copending U.S. Appl. No. 15/516,058.
U.S. Appl. No. 16/317,249, filed Jan. 11, 2019, US-2019/0300818 A1, Oct. 3, 2019, Bärz.
U.S. Appl. No. 16/317,305, filed Jan. 11, 2019, US-2020/0231898 A1, Jul. 23, 2020, Bärz.
U.S. Appl. No. 16/473,805, filed Jun. 26, 2019, US-2019/0323043 A1, Oct. 24, 2019, Diehl.
U.S. Appl. No. 16/639,529, filed Feb. 14, 2020, Burja.
U.S. Appl. No. 16/644,443, filed Mar. 4, 2020, US-2020/0231896 A1, Jul. 23, 2020, Bahl.
Notice of Appeal filed Jul. 18, 2020, for copending U.S. Appl. No. 15/516,024.
Appeal Brief filed Oct. 19, 2020, for copending U.S. Appl. No. 15/516,024.
Non Final Office Action dated Aug. 5, 2020 for copending U.S. Appl. No. 15/516,022.
Response to Non Final Office Action filed Dec. 5, 2020 for copending U.S. Appl. No. 15/516,022.
Final Rejection dated Dec. 11, 2020 for copending U.S. Appl. No. 15/516,022.

Bouvier, et al., "Aquafeed Twin Screw Extrusion Processing," Clextral Group, Firminy, France pp. 76-94 (2006).
Leyland, et al., "Are Thraustochytrids algae?," *Fungal Biology XXX*:1-6 (2017); http://dx.doi./org/10.1016/j.funbio.2017.07.006.
Raghukumar S., "Ecology of the marine protists, the Labyrinthulomycetes (Thraustochytrids and Labyrinthulids)," *Europ. J. Protistol.* 38:127-145 (2002).
Ratledge, C.," Exhibit A, Microbial production of polyunsaturated fatty acides as nutraceuticals," Microbial Production of Food Ingredients, Enzymes and Nutraceuticals, 2 pages (2013).
U.S. Appl. No. 16/956,453, filed Jun. 19, 2020, US-2020/0339498 A1, Oct. 29, 2020, Heining.
U.S. Appl. No. 17/055,047, filed Nov. 12, 2020, Heining.
U.S. Appl. No. 17/055,083, filed Nov. 12, 2020, Heining.
Examiner's Answer for copending U.S. Appl. No. 15/516,024, dated Jan. 28, 2021.
Reply Brief for copending U.S. Appl. No. 15/516,024, filed Mar. 26, 2021.
Notice of Appeal for copending U.S. Appl. No. 15/516,022, filed Apr. 11, 2021.
Appeal Brief for copending U.S. Appl. No. 15/516,022, filed Jul. 3, 2021.
U.S. Appl. No. 16/309,632, filed Dec. 13, 2018, US-2019/0249108 A1, Aug. 15, 2019, Cherinko.
U.S. Appl. No. 16/469,286, filed Jun. 13, 2019, US-2020/0015500 A1, Jan. 16, 2020, De Vriendt.
U.S. Appl. No. 16/636,940, filed Feb. 6, 2020, US-2020/0362373 A1, Nov. 19, 2020, Leininger.
U.S. Appl. No. 16/886,691, filed May 28, 2020, US-2020/0383353 A1, Dec. 10, 2020, Wilson.
U.S. Appl. No. 16/956,820, filed Jun. 22, 2020, US-2020/0404938 A1, Dec. 31, 2020, Heining.
U.S. Appl. No. 17/042,788, filed Sep. 28, 2020, US-2021/0024966 A1, Jan. 28, 2021, Heining.
U.S. Appl. No. 17/042,791, filed Sep. 28, 2020, US-2021/0017467 A1, Jan. 21, 2021, Adugna.
U.S. Appl. No. 17/284,463, filed Apr. 10, 2021, Erickson.
U.S. Appl. No. 17/291,608, filed May 6, 2021, Priefert.
U.S. Appl. No. 17/291,610, filed May 6, 2021, Priefert.
Reply Brief for copending U.S. Appl. No. 15/516,022, filed Sep. 26, 2021.
Pyle, et al., "Producing docosahexaenoic Acid (DHA)-rich algae from Biodiesel-derived crude glycerol: Effects of impurities on DHA production and algal biomass composition," *J. Agric. Food Chem.* 56(11):3933-3939 (2008).
Yaguchi, et al., "Production of High Yields of Docosahexaenoic Acid by *Schizochytrium* sp. Strain SR21," *JAOCS* 74(11):1431-1434 (1997).

\* cited by examiner

METHOD FOR RAISING ANIMALS

CROSS REFERENCE TO RELATED APPLICATIONS

The present application is US national stage of international application PCT/EP2015/071689, which had an international filing date of Sep. 22, 2015, and which was published in German under PCT Article 21(2) on Apr. 7, 2016. Priority is claimed to European application EP 14187467.7, filed on Oct. 2, 2014.

The present invention relates to a method for farming animals, using a feedstuff containing an *Aurantiochytrium* biomass.

Polyunsaturated fatty acids (PUFAs) are an important component for the nutrition of humans and animals. The source of PUFAs used was and is especially fish. Fish is generally used in the form of fish meal or fish oil for feeding.

Owing to the shortage of available fish stocks, alternative lipid sources have been sought. In this connection, the alternative used has been especially vegetable oil. Furthermore, it has been discovered that certain microbes produce PUFAs in large amounts heterotrophically.

The PUFAs may be subsequently obtained from the cells, or else the cells may be employed directly in feedstuffs or foodstuffs in the form of biomass.

Miller et al. (Comparative Biochemistry and Physiology, Part A 148 (2007) 382-392) describe the replacement of fish oil by palm oil, thraustochytrid oil or a mixture of palm oil and thraustochytrid oil. They state that the replacement of fish oil by thraustochytrid oil has no influence on the growth of salmon, but does increase the DHA content in fish muscle tissue.

Carter et al. (Mar. Biotechnol. 5, 480-492, 2003) state that the feeding of a mixture of canola oil and thraustochytrid biomass in comparison with a feeding of a mixture of canola oil and fish oil and in comparison with the feeding of only canola oil has no influence on the growth of salmon or the chemical composition of salmon; however, compared to the feeding of the mixture of canola oil and fish oil, a higher fish mortality rate was observed.

According to the invention, it has now been found that, surprisingly, it was possible to achieve a better growth in the case of substitution of fish oil with an *Aurantiochytrium* biomass than in the case of use of fish oil as the sole source of PUFAs, when the same fat content is set in the feedstuff in both cases.

According to the invention, it has been further found that it was possible to achieve a better growth in the case of farming of animals with a mixture of marine oil and a Labyrinthulea biomass than in the case of farming with either fish oil alone or Labyrinthulea biomass alone, when the same fat content has been set in the feedstuff in each case.

It is therefore an object of the present invention to provide a method for farming animals which improves the growth of the animals.

The present invention therefore firstly provides a feedstuff, characterized in that it comprises an *Aurantiochytrium* biomass.

In this connection, the *Aurantiochytrium* cells are preferably the species *Aurantiochytrium limacinum*, especially preferably the strain *Aurantiochytrium limacinum* SR21 (IFO 32693).

The present invention therefore also further provides a feedstuff, characterized in that it contains marine oil, preferably fish oil, and a Labyrinthulea biomass.

According to the invention, "marine oil" is to be understood in general to mean an oil obtained from a marine organism, preferably from a marine animal. Besides fish oil, which is preferred according to the invention, it is additionally also to be understood to mean oil isolated from other marine organisms, in particular from marine animals, for example from krill, bivalves, squids or shrimps. Preferably, the marine oil to be used according to the invention is fish oil, in particular a fatty oil from fish, especially preferably a fatty oil from fish of the families Engraulidae, Carangidae, Clupeidae, Osmeridae, Scombridae and/or Ammodytidae.

Labyrinthulea are also known as Labyrinthulomycetes or slime nets. The Labyrinthulea are preferably those from the family of the Thraustochytriaceae. The family of the Thraustochytriaceae includes the genera *Althornia, Aplanochytrium, Elnia, Japonochytrium, Schizochytrium, Thraustochytrium, Aurantiochytrium, Oblongichytrium* and *Ulkenia*. Particular preference is given to the genera *Thraustochytrium, Schizochytrium, Aurantiochytrium* and *Oblongichytrium*, above all the genus *Aurantiochytrium*. Within the genus *Aurantiochytrium*, preference is given, according to the invention, to the species *Aurantiochytrium limacinum* (previously also known as *Schizochytrium limacinum*). According to the invention, very particular preference is given to using the strain *Aurantiochytrium limacinum* SR21 (IFO 32693).

The marine oil and the Labyrinthulea biomass are used in the feedstuff, based on the dry weight of the biomass, preferably in a weight ratio of 3:1 to 1:6, in particular 2:1 to 1:5, especially preferably 3:2 to 1:4, in particular 1:1 to 1:3, above all in a ratio of about 2:3.

The cells present in the biomass are preferably distinguished by the fact that they have a PUFA content of at least 20% by weight, preferably at least 25% by weight, in particular at least 30% by weight, based in each case on the cell dry mass, with preferably at least 50% by weight, in particular at least 75% by weight and, in an especially preferred embodiment, at least 90% by weight of the lipids present in the cell being present in the form of triglycerides.

According to the invention, the polyunsaturated fatty acid (PUFA) is preferably a highly unsaturated fatty acid (HUFA).

According to the invention, polyunsaturated fatty acids (PUFAs) are understood to mean fatty acids having at least two, particularly at least three, C—C double bonds. According to the invention, highly unsaturated fatty acids (HUFAs) are preferred among the PUFAs. According to the invention, HUFAs are understood to mean fatty acids having at least four C—C double bonds.

The PUFAs may be present in the cell in free form or in bound form. Examples of the presence in bound form are phospholipids and esters of the PUFAs, in particular monoacyl-, diacyl- and triacylglycerides. In a preferred embodiment, the majority of the PUFAs is present in the form of triglycerides, with preferably at least 50% by weight, in particular at least 75% by weight and, in an especially preferred embodiment, at least 90% by weight of the PUFAs present in the cell being present in the form of triglycerides.

Preferred PUFAs are omega-3 fatty acids and omega-6 fatty acids, with omega-3 fatty acids being especially preferred. Preferred omega-3 fatty acids in this context are eicosapentaenoic acid (EPA, 20:5ω-3), in particular (5Z,8Z,11Z,14Z,17Z)-eicosa-5,8,11,14,17-pentaenoic acid, and docosahexaenoic acid (DHA, 22:6ω-3), in particular (4Z,7Z,10Z,13Z,16Z,19Z)-docosa-4,7,10,13,16,19-hexaenoic acid, with docosahexaenoic acid being especially preferred.

A biomass especially preferred according to the invention therefore contains DHA in an amount of at least 20% by weight, preferably at least 25% by weight, in particular at least 30% by weight, based in each case on the cell dry mass, with preferably at least 50% by weight, in particular at least 75% by weight and, in an especially preferred embodiment, at least 90% by weight of the lipids present in the cell being present in the form of triglycerides.

In a preferred embodiment, the feedstuff according to the invention contains meal from marine organisms, in particular meal from marine animals, preferably fish meal, as a further ingredient.

According to the invention, "meal from marine organisms" is to be understood in general to mean the processed product of marine organisms in particular the processed product of marine animals. Besides fish meal, which is preferably used according to the invention, this is to be understood according to the invention to mean in particular also krill meal, bivalve meal, squid meal or shrimp shells, which are classic replacement products for fish meal. However, the meal from marine organisms is especially preferably fish meal.

The meal from marine organisms, in particular marine animals, preferably fish meal, and the biomass are used in the feedstuff, based on the dry weight, preferably in a weight ratio of 1:4 to 8:1, in particular of 1:2 to 6:1, especially preferably of 1:1 to 3:1, in particular of 1:1 to 2:1, above all in a ratio of about 5:3.

The marine oil, in particular oil from marine animals, above all fish oil, is present in the feedstuff in relation to the meal from marine organisms, in particular meal from marine animals, above all fish meal, preferably in a weight ratio of 1:10 to 2:1, in particular 1:5 to 1:1, especially preferably 1:4 to 1:2. Especially preferably, the weight ratio of marine oil, in particular fish oil, to meal from marine organisms is about 1:3.

In a feedstuff according to the invention, the biomass, based on the dry mass, is preferably present in an amount of 2 to 20% by weight, preferably 3 to 18% by weight, in particular 5 to 15% by weight, above all 7 to 11% by weight.

Furthermore, marine oil, in particular oil from marine animals, above all fish oil, if used, is preferably present in a feedstuff according to the invention in an amount of 1 to 12% by weight, in particular 2 to 8% by weight, especially preferably 3 to 7% by weight, above all 4 to 6% by weight.

Furthermore, meal from marine organisms, in particular meal from marine animals, above all fish meal, if used, based on the dry mass, is preferably present in a feedstuff according to the invention in an amount of 5 to 25% by weight, preferably 10 to 20% by weight, especially preferably 12 to 18% by weight.

According to the invention, the fact that the aforementioned components biomass, marine oil and meal from marine organisms are present in the specified amount in the feedstuff means that they are used in the corresponding amount in the production of the feedstuff.

Accordingly, the present invention further provides similarly a process for producing feedstuffs according to the invention, characterized in that the aforementioned components are used in the aforementioned amounts for producing the feedstuff. Therefore, the present invention further provides also a feedstuff obtainable by a process according to the invention.

In a preferred embodiment, the sum total of biomass, marine oil, in particular oil from marine animals, preferably fish oil, and meal from marine organisms, in particular meal from marine animals, above all fish meal, amounts preferably to at least 15% by weight, especially preferably at least 20% by weight, in particular 20 to 40% by weight, above all at least 25% by weight, in particular 25 to 35% by weight, of the feedstuff according to the invention.

The other feedstuff ingredients are preferably selected from protein-containing, carbohydrate-containing, nucleic-acid-containing and lipid-soluble components and, if appropriate, further fat-containing components and furthermore from among other additives such as minerals, vitamins, pigments and amino acids. Besides, structurants may also be present, besides nutrients, for example so as to improve the texture or the appearance of the feedstuff. Furthermore, it is also possible to employ, for example, binders so as to influence the consistency of the feedstuff. A component which is preferably employed and which constitutes both a nutrient and a structurant is starch.

A feedstuff according to the invention preferably has a total protein content of 30 to 60% by weight, preferably 35 to 55% by weight, in particular 40 to 50% by weight.

Furthermore, a feedstuff according to the invention preferably has a total fat content of 15 to 35% by weight, preferably 18 to 32% by weight, in particular 20 to 30% by weight, above all 22 to 28% by weight.

Furthermore, a feedstuff according to the invention preferably has a total starch content of at most 25% by weight, in particular at most 20% by weight, preferably 5 to 15% by weight, especially preferably 7 to 13% by weight.

Furthermore, a feedstuff according to the invention preferably has a polyunsaturated fatty acid (PUFA) content of 1 to 12% by weight, preferably 2 to 10% by weight, in particular 4 to 8% by weight, above all 5 to 7% by weight.

Furthermore, a feedstuff according to the invention preferably has an omega-3 fatty acid content of 0.1 to 6.0% by weight, preferably 0.5 to 5.0% by weight, in particular 1.0 to 4.5% by weight, above all 2.0 to 4.0% by weight, in particular 2.5 to 3.5% by weight.

Furthermore, a feedstuff according to the invention preferably has a DHA content of 0.05 to 4.0% by weight, preferably 0.25 to 3.0% by weight, in particular 0.5 to 2.8% by weight, above all 1.0 to 2.5% by weight, in particular 1.4 to 2.0% by weight.

A feedstuff especially preferred according to the invention has the following properties:
- a total protein content of 30 to 60% by weight, preferably 35 to 55% by weight, in particular 40 to 50% by weight;
- a total fat content of 15 to 35% by weight, preferably 18 to 32% by weight, in particular 20 to 30% by weight, above all 22 to 28% by weight;
- a total starch content of at most 25% by weight, in particular at most 20% by weight, preferably 5 to 15% by weight, especially preferably 7 to 13% by weight;
- a polyunsaturated fatty acid (PUFA) content of 1 to 12% by weight, preferably 2 to 10% by weight, in particular 4 to 8% by weight, above all 5 to 7% by weight;
- an omega-3 fatty acid content of 0.1 to 6% by weight, preferably 0.5 to 5% by weight, in particular 1.0 to 4.5% by weight, above all 2.0 to 4.0% by weight, in particular 2.5 to 3.5% by weight;
- a DHA content of 0.05 to 4.0% by weight, preferably 0.25 to 3.0% by weight, in particular 0.5 to 2.8% by weight, above all 1.0 to 2.5% by weight, in particular 1.4 to 2.0% by weight.

The invention therefore also preferably provides a feedstuff having the following properties:
- a total protein content of 30 to 60% by weight, preferably 35 to 55% by weight, in particular 40 to 50% by weight;

a total fat content of 15 to 35% by weight, preferably 18 to 32% by weight, in particular 20 to 30% by weight, above all 22 to 28% by weight;

a total starch content of at most 25% by weight, in particular at most 20% by weight, preferably 5 to 15% by weight, especially preferably 7 to 13% by weight;

a content of Labyrinthulea biomass, in particular Thraustochytriaceae biomass, of 2 to 20% by weight, preferably 3 to 18% by weight, in particular 5 to 15% by weight, above all 7 to 11% by weight;

preferably a content of marine oil, in particular fish oil, of up to 12% by weight, in particular 1 to 10% by weight, preferably 2 to 8% by weight, especially preferably 3 to 7% by weight, above all 4 to 6% by weight;

preferably a polyunsaturated fatty acid (PUFA) content of 1 to 12% by weight, preferably 2 to 10% by weight, in particular 4 to 8% by weight, above all 5 to 7% by weight;

preferably an omega-3 fatty acid content of 0.1 to 6% by weight, preferably 0.5 to 5% by weight, in particular 1.0 to 4.5% by weight, above all 2.0 to 4.0% by weight, in particular 2.5 to 3.5% by weight;

preferably a DHA content of 0.05 to 4.0% by weight, preferably 0.25 to 3.0% by weight, in particular 0.5 to 2.8% by weight, above all 1.0 to 2.5% by weight, in particular 1.4 to 2.0% by weight.

The invention therefore also preferably provides a feedstuff having the following properties:

a total protein content of 30 to 60% by weight, preferably 35 to 55% by weight, in particular 40 to 50% by weight;

a total fat content of 15 to 35% by weight, preferably 18 to 32% by weight, in particular 20 to 30% by weight, above all 22 to 28% by weight;

a total starch content of at most 25% by weight, in particular at most 20% by weight, preferably 5 to 15% by weight, especially preferably 7 to 13% by weight;

a content of *Aurantiochytrium* biomass, in particular *Aurantiochytrium limacinum* biomass, above all *Aurantiochytrium limacinum* SR21 biomass, of 2 to 20% by weight, preferably 3 to 18% by weight, in particular 5 to 15% by weight, above all 7 to 11% by weight;

preferably a polyunsaturated fatty acid (PUFA) content of 1 to 12% by weight, preferably 2 to 10% by weight, in particular 4 to 8% by weight, above all 5 to 7% by weight;

preferably an omega-3 fatty acid content of 0.1 to 6% by weight, preferably 0.5 to 5% by weight, in particular 1.0 to 4.5% by weight, above all 2.0 to 4.0% by weight, in particular 2.5 to 3.5% by weight;

preferably a DHA content of 0.05 to 4.0% by weight, preferably 0.25 to 3.0% by weight, in particular 0.5 to 2.8% by weight, above all 1.0 to 2.5% by weight, in particular 1.4 to 2.0% by weight.

The invention therefore also very particularly preferably provides a feedstuff having the following properties:

a total protein content of 40 to 50% by weight;

a total fat content of 20 to 30% by weight;

a total starch content of at most 20% by weight, preferably 5 to 15% by weight;

a content of *Aurantiochytrium limacinum* SR21 biomass of 5 to 15% by weight, above all 7 to 11% by weight;

a polyunsaturated fatty acid (PUFA) content of 2 to 10% by weight, in particular 4 to 8% by weight, above all 5 to 7% by weight;

an omega-3 fatty acid content of 0.5 to 5% by weight, in particular 1.0 to 4.5% by weight, above all 2.0 to 4.0% by weight, in particular 2.5 to 3.5% by weight;

a DHA content of 0.25 to 3.0% by weight, in particular 0.5 to 2.8% by weight, above all 1.0 to 2.5% by weight, in particular 1.4 to 2.0% by weight.

According to the invention, the fat-containing component used may be, besides the biomass to be used according to the invention and the optionally used marine oil, further fats, in particular oils, of both animal and plant origin.

According to the invention, further suitable fat-containing components are in particular vegetable oils, for example soya bean oil, rapeseed oil, sunflower seed oil, flaxseed oil or palm oil and mixtures thereof.

Preferably, a feedstuff according to the invention contains vegetable oils in an amount of 3 to 18% by weight, in particular 5 to 15% by weight, above all 7 to 13% by weight. According to the invention, these are preferably applied to the extrudate after extrusion, in particular by vacuum coating.

According to the invention, the protein-containing component used may be, for example, soya protein, pea protein, wheat gluten or corn gluten and mixtures thereof.

The carbohydrate-containing component used may be, for example, wheat meal, sunflower meal or soya meal and mixtures thereof.

The biomass may be used both in intact form and after prior cell disruption for producing a feedstuff according to the invention. To this end, the biomass is mixed with the further feedstuff ingredients and then processed into the feedstuff according to the invention.

In the event of a prior cell disruption being carried out, this is preferably carried out as described in the applications WO2014/122087 or WO2014/122092.

The mixture of biomass and further feedstuff ingredients is processed in a preferred embodiment by an extrusion process, in order to obtain portions of foodstuff or feedstuff ready for sale. Alternatively, a pelleting method may also be used, for example.

It is preferred to intimately mix the components with each other before carrying out the extrusion process. This is preferably carried out in a drum equipped with vanes. In a preferred embodiment, this mixing step includes an injection of steam, in particular so as to bring about swelling of the starch which is preferably present. In this case, the injection of steam is carried out preferably at a pressure of 1 to 5 bar, especially preferably at a pressure of 2 to 4 bar.

Before being mixed with the algae biomass, the further feedstuff ingredients are preferably comminuted—if required—so as to ensure that a homogeneous mixture is obtained in the mixing step. The comminuting of the further feedstuff ingredients may be carried out, for example, using a hammer mill.

The extrusion is additionally preferably done at an energy input of 12-28 Wh/kg, in particular 14-26 Wh/kg, especially preferably 16-24 Wh/kg, above all 18-22 Wh/kg.

In this connection, a screw or twin-screw extruder is preferably employed in the extrusion process. The extrusion process is preferably carried out at a temperature of 80-220° C., particularly 80-130° C., a pressure of 10-40 bar, and a shaft rotational speed of 100-1000 rpm, particularly 300-700 rpm. The residence time of the mixture introduced is preferably 5-30 seconds, in particular 10-20 seconds.

The extrudate created preferably has a diameter of 1 to 14 mm, preferably 2 to 12 mm, in particular 2 to 6 mm, and preferably also has a length of 1 to 14 mm, preferably 2 to 12 mm, in particular 2 to 6 mm. The length of the extrudate is set during extrusion by using a cutting tool. The length of the extrudate is preferably selected such that it approximately corresponds to the diameter of the extrudate. The diameter of the extrudate is defined by selecting the screen diameter.

The extrusion process may optionally comprise a compacting step and/or a compression step.

After extrusion, the extrudate is preferably dried to a moisture content of at most 5% by weight and the extrusion product is subsequently preferably loaded with oil. Oil may be loaded by placing the extrudate in oil or spraying the extrudate with oil; however, according to the invention, preference is given to vacuum coating.

According to the invention, the extrudate is preferably subsequently loaded with oil to the extent that a total fat content of 15-35% by weight, preferably 20-30% by weight, ensues in the final product.

The feedstuff according to the invention is preferably present in the form of flakes, spheres or tablets. A feedstuff obtainable by extrusion preferably has a moisture content of less than 10% by weight, in particular less than 5% by weight, especially preferably 0.2 to 4% by weight.

According to the invention, "dry mass" is accordingly preferably to be understood to mean a product having a moisture content of below 10% by weight, in particular below 5% by weight.

The present invention also further provides a method for farming animals, characterized in that they are administered with a feedstuff according to the invention.

In this connection, the present invention provides in particular a method for increasing the growth of animals, characterized in that they are administered with a feedstuff according to the invention.

The present invention further provides in particular similarly a method for increasing the fraction of omega-3 fatty acids, in particular DHA, in the muscle tissue of animals, characterized in that they are administered with a feedstuff according to the invention.

Preferably, in the method according to the invention, the feedstuff is administered at least every two days, preferably at least once daily.

The present invention further provides similarly the use of a feedstuff according to the invention for increasing growth in animals.

The present invention further provides likewise the use of a feedstuff according to the invention for increasing the fraction of omega-3 fatty acids in muscle tissue in animals.

The present invention further provides likewise the use of a feedstuff according to the invention for improving the physical condition of animals, in particular for improving the stress level of animals.

The present invention further provides likewise the use of a feedstuff according to the invention for allowing a stress-reduced farming of the animals.

The farmed animals fed with a feedstuff according to the invention are preferably poultry, pigs or cattle.

However, the farmed animals are especially preferably marine animals, especially preferably finfish or crustaceans. These include, in particular, carp, tilapia, catfish, tuna, salmon, trout, barramundi, bream, perch, cod, shrimps, lobster, crabs, prawns and crayfish. The farmed animals are especially preferably salmon. Preferred types of salmon in this context are the Atlantic salmon, red salmon, masu salmon, king salmon, keta salmon, coho salmon, Danube salmon, Pacific salmon and pink salmon.

The farmed animals may in particular also be fish which are subsequently processed into fish meal or fish oil. In this connection, the fish are preferably herring, pollack, menhaden, anchovies, capelin or cod. The fish meal or fish oil thus obtained, in turn, can be used in aquaculture for farming edible fish or crustaceans.

However, the farmed animals may also be small organisms which are used as feedstuff in aquaculture. These small organisms may take the form of, for example, nematodes, crustaceans or rotifers.

The farming of marine animals may take place in ponds, tanks, basins or else in segregated areas in the sea or in lakes, in particular in this case in cages or net pens. Farming may be used for farming the finished edible fish, but also may be used for farming fry which are subsequently released so as to restock the wild fish stocks.

In salmon farming, the fish are preferably first grown into smolts in freshwater tanks or artificial watercourses and then grown on in cages or net pens which float in the sea and which are preferably anchored in bays or fjords.

Accordingly, the feedstuff according to the invention is preferably a feedstuff for use in the farming of the above-mentioned animals.

The Labyrinthulea biomass used according to the invention, in particular the *Aurantiochytrium* biomass, is preferably the product of a fermentative culturing process and is accordingly preferably obtained proceeding from a fermentation broth obtained by fermentation of these algae. The fermentation broth to be used according to the invention for obtaining the algae biomass preferably comprises further constituents of the fermentation medium in addition to the biomass to be dried. These constituents may take the form of, in particular, salts, antifoam agents and unreacted carbon source and/or nitrogen source. In the drying process, a product is preferably formed having a cell content of at least 60% by weight, preferably at least 65% by weight, particularly at least 70 or 80% by weight, comprising anti-caking agents added as further constituents, such as silicas for example, and optionally further constituents of the fermentation medium and also optionally components liberated partially from the cells. The further constituents of the fermentation broth may optionally be partially removed prior to drying the biomass, for example by solid-liquid separation methods, such that a product is formed in the drying process that comprises these further components of the fermentation broth, particularly salts, preferably in an amount of at most 20% by weight, particularly at most 15, 10 or 5% by weight.

Processes for producing biomasses usable according to the invention have been described in detail in the prior art (see, for example, WO91/07498, WO94/08467, WO97/37032, WO97/36996, WO01/54510). As a rule, the production takes place by cells being cultured in a fermenter in the presence of a carbon source and of a nitrogen source. In this context, biomass densities of more than 100 grams per litre and production rates of more than 0.5 gram of lipid per litre per hour may be attained. The process is preferably carried out as what is known as a fed-batch process, i.e. the carbon and nitrogen sources are fed in incrementally during the fermentation. Once the desired biomass has been obtained, lipid production may be induced by various measures, for example by limiting the nitrogen source, the carbon source or the oxygen content or combinations of these.

Preferably, the cells are fermented in a medium with low salinity, in particular so as to avoid corrosion. This can be achieved by employing chlorine-free sodium salts as the sodium source instead of sodium chloride, such as, for example, sodium sulphate, sodium carbonate, sodium hydrogen carbonate or soda ash. Preferably, chloride is employed in the fermentation in amounts of less than 3 g/l, in particular less than 500 mg/l, especially preferably less than 100 mg/l.

Suitable carbon sources are both alcoholic and non-alcoholic carbon sources. Examples of alcoholic carbon sources are methanol, ethanol and isopropanol. Examples of non-alcoholic carbon sources are fructose, glucose, sucrose, molasses, starch and corn syrup.

Suitable nitrogen sources are both inorganic and organic nitrogen sources. Examples of inorganic nitrogen sources are nitrates and ammonium salts, in particular ammonium sulphate and ammonium hydroxide. Examples of organic nitrogen sources are amino acids, in particular glutamate, and urea.

In addition, inorganic or organic phosphorus compounds and/or known growth-stimulating substances, such as, for example, yeast extract or corn steep liquor, may also be added so as to have a positive effect on the fermentation.

In a preferred embodiment, the amount of sulphate added during fermentation is selected such that a sulphate content of at least 25 g/kg, in particular 25 to 60 g/kg, preferably 25 to 50, 25 to 40 or 25 to 35 g/kg, with regard to the dry mass, ensues in the resulting biomass.

The sulphate content in the resulting biomass may be set in different ways.

For example, in what is known as a batch process, the required amount of sulphate may be initially charged in full right at the start. The amount of sulphate required can be easily calculated, since the cells used to form the biomass virtually completely assimilate the sulphate.

When using what is known as a fed-batch process, the amount of sulphate required may alternatively be metered in during the course of fermentation or, accordingly, some of the sulphate may be initially charged and the remainder metered in during the course of fermentation.

Especially when it emerges during the course of fermentation that the amount of biomass produced exceeds the originally calculated value, it is possible to ensure by subsequent metering-in of sulphate that the resulting biomass contains the preferred amount of sulphate.

The sulphate salt used is preferably sodium sulphate, ammonium sulphate or magnesium sulphate and also mixtures thereof.

During fermentation, the chloride content is, with regard to the liquid fermentation medium including the biomass present, preferably always below 3 g/kg, in particular below 1 g/kg, especially preferably below 400 mg/kg of fermentation medium.

In addition to sulphates and any chlorides used, it is also optionally possible during fermentation to use further salts, especially those selected from sodium carbonate, sodium hydrogen carbonate, soda ash or inorganic phosphorus compounds.

If further salts are used, these are preferably used in an amount such that each one during fermentation, with regard to the liquid fermentation medium including the biomass present, is present in each case in an amount of less than 10 g/kg, in particular less than 5 g/kg, especially preferably less than 3 g/kg in the fermentation medium.

According to the invention, the total salt content in the fermentation medium including the biomass present is preferably always below 35 g/kg, in particular below 30 g/kg, during the course of the entire fermentation process. Especially preferably, the total salt content during the entire fermentation process, with regard to the liquid fermentation medium including the biomass present, is between 10 and 35 g/kg, in particular between 12 and 30 g/kg.

According to the invention, the sulphate content in the fermentation medium including the biomass present is preferably always between 5 and 16 g/kg during the course of the entire fermentation process.

According to the invention, "sulphate content" is to be understood to mean the total content of sulphate, i.e. the content of free and bound, in particular organically bound, sulphate. It can be assumed that the majority of the sulphate present in the biomass is present as a constituent of exopolysaccharides, which are involved in the formation of the cell wall of microorganisms.

According to the invention, the sulphate content is preferably determined by ascertaining the sulphur content of the biomass obtained, since the majority of the sulphur present in the biomass can be attributed to the sulphate present. Sulphur which can be attributed to other sources can be disregarded owing to the amount of sulphate present. Thus, the amount of sulphate present can be readily ascertained from the amount of sulphur ascertained.

In this connection, the sulphur content of the biomass is preferably determined by elemental analysis in accordance with DIN EN ISO 11885. For the analysis of the sulphur content of the biomass, appropriate aliquots of sample are disrupted preferably with nitric acid and hydrogen peroxide at 240° C. under pressure prior to the analysis in order to ensure the free accessibility of the sulphur present.

For the production of the feedstuff, it is therefore preferable according to the invention to use a PUFA-containing biomass which is distinguished by the fact that a sulphur content of 8 to 20 g/kg, based on the dry mass, can be detected therein by elemental analysis in accordance with DIN EN ISO 11885. In this connection, the sulphur content in the biomass is preferably 8 to 17 g/kg, in particular 8 to 14 g/kg, especially preferably 8 to 12 g/kg, based in each case on the dry mass.

According to the invention, the phosphorus content of biomasses preferably used according to the invention is, with regard to the dry mass, preferably 1 to 6 g/kg, in particular 2 to 5 g/kg. The phosphorus content is preferably likewise ascertained by elemental analysis in accordance with DIN EN ISO 11885.

The cells are preferably fermented at a pH of 3 to 11, in particular 4 to 10, and preferably at a temperature of at least 20° C., in particular 20 to 40° C., especially preferably at least 30° C. A typical fermentation process takes up to approximately 100 hours.

According to the invention, the cells are preferably fermented up to a biomass density of at least 50, 60 or 70 g/l, in particular at least 80 or 90 g/l, especially preferably at least 100 g/l.

In this case, the data are based on the content of dry biomass in relation to the total volume of the fermentation broth after the fermentation has ended. The content of dry biomass is determined by filtering-off of the biomass from the fermentation broth, subsequent washing with water, then complete drying—for example in the microwave—and lastly ascertainment of the dry weight.

After the fermentation has ended, the biomass is harvested. After harvesting the biomass or optionally even shortly before harvesting the biomass, the cells are preferably pasteurized in order to kill the cells and to inactivate enzymes which might promote lipid degradation. The pasteurization is preferably effected by heating the biomass to a temperature of 50 to 121° C. for a period of 5 to 60 minutes.

Likewise, after harvesting the biomass or optionally even shortly before harvesting the biomass, antioxidants are preferably added in order to protect the material of value present in the biomass from oxidative degradation. Preferred antioxidants in this context are BHT, BHA, TBHA, ethoxyquin, beta-carotene, vitamin E and vitamin C. The antioxidant, if used, is preferably added in an amount of 0.01 to 2% by weight.

Optionally, it is then possible before the actual drying to remove early on a portion of the fermentation medium from the biomass and to thus increase the solid fraction. This may be carried out in particular by centrifugation, flotation, filtration, particularly ultrafiltration or microfiltration, decanting and/or solvent evaporation. In this case, solvent evaporation is preferably carried out using a rotary evaporator, a thin-film evaporator or a falling-film evaporator in a single-stage or multistage process. Alternatively, reverse osmosis, for example, is also useful for concentrating the fermentation broth.

In this first optional but preferred step, the fermentation broth is preferably concentrated to a solids content of at least 10 or 15% by weight, preferably of at least 20 or 25% by weight, particularly 10 to 50 or 15 to 45% by weight, particularly preferably 15 to 40% by weight or 20 to 40% by weight.

After the optional concentration of the fermentation broth, the biomass is dried, preferably by thermal drying, especially preferably by spray drying, particularly nozzle spray drying, spray granulation, fluidized bed granulation, or in a drum dryer.

Alternatively, the biomass may also be subjected to the drying step directly after harvesting without prior concentration, particularly if the fermentation broth obtained already has a high solids content, preferably as stated above.

On drying the biomass, this is preferably dried to a residual moisture content of at most 10% by weight, particularly 0 to 10% by weight, particularly preferably at most 8% by weight, particularly 0.5 to 8% by weight, above all at most 6 or 5% by weight, particularly 0.5 to 6 or 0.5 to 5% by weight.

In a particularly preferred embodiment of the invention, the biomass is dried in a fluidized bed granulation process or a nozzle spray drying process, as described in EP13176661.0 for example.

During the drying process, silica may optionally be added to the biomass as anti-caking agent so that the biomass can be converted to an easier-to-manage state. For this purpose, the fermentation broth comprising biomass and also the silica are preferably sprayed into the particular drying zone. Alternatively, the biomass is preferably mixed with the silica only after the drying process. In this regard, reference is also made in particular to the patent application EP13187631.0.

In a preferred embodiment, a biomass to be used according to the invention has a concentration of silica, in particular hydrophilic or hydrophobic silica, of 0.2 to 10% by weight, in particular 0.5 to 5% by weight, especially 0.5 to 2% by weight, after the drying process.

A free-flowing, fine-grained or coarse-grained product, preferably a granulate, is preferably obtained by the drying process. A product having the desired particle size can optionally be obtained from the granulate obtained by sieving or dust separation.

Providing a free-flowing, fine-grained powder was obtained, this can optionally be converted into a coarse-grained, free-flowing and largely dust-free product, which can be stored, by suitable compacting or granulating processes.

Conventional organic or inorganic auxiliaries or supports such as starch, gelatin, cellulose derivatives or similar substances, which are typically used in food processing or feed processing as binding agents, gelling agents or thickeners, may optionally be used in this subsequent granulation or compacting process.

"Free-flowing" according to the invention is understood to mean a powder that can flow out unhindered from a series of glass efflux vessels having different size outflow openings, at least from the vessel having the 5 millimetre opening (Klein: Seifen, Öle, Fette, Wachse 94, 12 (1968)).

"Fine-grained" according to the invention is understood to mean a powder having a predominant fraction (>50%) of particle sizes of 20 to 100 micrometres in diameter.

"Coarse-grained" according to the invention is understood to mean a powder having a predominant fraction (>50%) of particle sizes of 100 to 2500 micrometres in diameter.

"Dust-free" according to the invention is understood to mean a powder that contains only low fractions (<10%, preferably <5%) of particle sizes below 100 micrometres.

Particle sizes are preferably determined according to the invention by laser diffraction spectrometric methods. Possible methods are described in the textbook "Teilchengrößenmessung in der Laborpraxis" [Particle size measurement in the laboratory] by R. H. Müller and R. Schuhmann, Wissenschaftliche Verlagsgesellschaft Stuttgart (1996) and in the textbook "Introduction to Particle Technology" by M. Rhodes, Wiley & Sons (1998). Inasmuch as various methods can be used, the first-cited usable method from the textbook by R. H. Müller and R. Schuhmann for the measuring of particle size is preferably used.

The biomass obtained by drying preferably has a fraction of at least 80% by weight, particularly at least 90% by weight, particularly preferably at least 95% by weight, of particles having a particle size of 100 to 3500 micrometres, preferably 100 to 3000 micrometres, above all 100 to 2500 micrometres.

The products of a fluidized bed granulation process used according to the invention preferably have in this case a fraction of at least 80% by weight, particularly at least 90% by weight, particularly preferably at least 95% by weight, of particles having a particle size of 200 to 3500 micrometres, preferably 300 to 3000 micrometres, above all 500 to 2500 micrometres.

The products of a spray drying process used according to the invention preferably have in contrast a fraction of at least 80% by weight, particularly at least 90% by weight, particularly preferably at least 95% by weight, of particles having a particle size of 100 to 500 micrometres, preferably 100 to 400 micrometres, above all 100 to 300 micrometres.

The products of a spray drying process and subsequent granulation process used according to the invention preferably have a fraction of at least 80% by weight, particularly at least 90% by weight, particularly preferably at least 95% by weight, of particles having a particle size of 100 to 1000 micrometres.

In the biomass used, the fraction of dust, i.e. particles having a particle size of less than 100 micrometres, is preferably at most 10% by weight, particularly at most 8% by weight, particularly preferably at most 5% by weight, above all at most 3% by weight.

The bulk density of the biomass used is preferably from 400 to 800 kg/m$^3$, particularly preferably from 450 to 700 kg/m$^3$.

WORKING EXAMPLES

Example 1

Producing the Biomass

Example 1

Producing Biomass by Fermentation of *Aurantiochytrium limacinum* SR21 in a Medium Having a High Sulphate Content and Subsequent Drying of the Biomass The cells were cultured for about 75 h in a feed process using a steel fermenter having a fermenter volume of 2 litres with a total starting mass of 712 g and an attained total final mass of 1.3-1.5 kg. During the process, a glucose solution (570 g/kg glucose) was metered in (fed-batch process)

The composition of the starting medium was as follows:

Medium 1:20 g/kg glucose; 4 g/kg yeast extract; 16 g/kg sodium sulphate; 2 g/kg ammonium sulphate; 2.46 g/kg magnesium sulphate (heptahydrate); 0.45 g/kg potassium chloride; 4.5 g/kg potassium dihydrogen phosphate; 0.1 g/kg thiamine (HCl); 5 g/kg trace element solution.

The composition of the trace element solution was as follows: 35 g/kg hydrochloric acid (37%); 1.86 g/kg manganese chloride (tetrahydrate); 1.82 g/kg zinc sulphate (heptahydrate); 0.818 g/kg sodium EDTA; 0.29 g/kg boric acid; 0.24 g/kg sodium molybdate (dihydrate); 4.58 g/kg calcium chloride (dihydrate); 17.33 g/kg iron sulphate (heptahydrate); 0.15 g/kg copper chloride (dihydrate).

Culturing was carried out under the following conditions: Culture temperature 28° C.; aeration rate 0.5 vvm, stirrer speed 600-1950 rpm, control of pH in the growth phase at 4.5 using ammonia water (25% v/v).

After the culturing process, the fermentation broths were heated to 60° C. for 20 minutes in order to prevent further cellular activity.

This was followed by a two-stage drying of the biomass: Firstly, the fermentation broth was concentrated by evaporation to a dry mass of about 20% by weight. This was followed by spray drying of the concentrated fermentation broth using a Production Minor™ spray dryer (GEA NIRO) at a drying air inlet temperature of 340° C. By means of spray drying, a powder having a dry mass of more than 95% by weight was thus obtained.

The sulphate content of the biomass obtained was determined by determining the sulphur content of the biomass in accordance with DIN ISO 11885. To this end, an aliquot of the biomass was firstly disrupted under pressure at 240° C. with nitric acid and hydrogen peroxide. The sulphur content ascertained was 11 g/kg of biomass, corresponding to a sulphate content of 33 g/kg of biomass.

Example 2

Producing the Feedstuff

Feedstuffs each containing 42.5% by weight of total protein and 24% by weight of total lipid, based on the dry mass, and having a pellet size of 3 mm were produced by extrusion.

Three different feedstuff formulations in total were produced (Diet 1, 2 and 3). The control formulation "Diet 1" contained 11.0% by weight of fish oil. In the formulation "Diet 2", the fish oil was partly (about 50%) replaced by *Aurantiochytrium* biomass, this being done by adding 9.1% by weight of biomass and, for that reason, reducing the amount of fish oil to 5.5% by weight. In the formulation "Diet 3", the fish oil was completely replaced by *Aurantiochytrium* biomass, this being done by adding 16% by weight of biomass and, at the same time, increasing the amount of rape oil from 8.2% to 9.9% by weight. Differences in the total weight were balanced out by the amount of wheat added.

The individual components of the feedstuff are shown in the table below.

TABLE 1

| Formulations used for farming | | | |
|---|---|---|---|
| Components (g kg$^{-1}$) | Diet 1 | Diet 2 | Diet 3 |
| Aurantiochytrium biomass | 0.0 | 91.6 | 160.0 |
| SPC | 229.0 | 229.0 | 229.0 |
| Fish meal | 150.0 | 150.0 | 150.0 |
| Wheat | 147.6 | 111.0 | 80.5 |
| Fish oil | 110.0 | 55.0 | 0.0 |
| Wheat gluten | 100.0 | 100.0 | 100.0 |
| Pea protein concentrate | 100.0 | 100.0 | 100.0 |
| Rape oil | 82.0 | 82.0 | 99.1 |
| Monosodium phosphate | 20.0 | 20.0 | 20.0 |
| Vitamin mixture | 20.0 | 20.0 | 20.0 |
| Soya lecithin | 10.0 | 10.0 | 10.0 |
| L-Lysine (50% by weight) | 10.0 | 10.0 | 10.0 |
| Betafine | 9.4 | 9.4 | 9.4 |
| Mineral mixture | 5.2 | 5.2 | 5.2 |
| L-Histidine (98% by weight) | 4.2 | 4.2 | 4.2 |
| DL-Methionine (99% by weight) | 2.0 | 2.0 | 2.0 |
| Carop. Pink (10% by weight) | 0.50 | 0.50 | 0.50 |
| Yttrium oxide | 0.10 | 0.10 | 0.10 |

The individual components were—with the exception of the oils—mixed intimately with each other and then an extrudate was produced using a twin-screw extruder (Wenger TX 52, Wenger, USA) through use of an outlet nozzle having a diameter of 2 mm. The extrudates were dried for about 1 hour in a carousel dryer (Paul Klöckner, Verfahrenstechnik GmbH, Germany) at 65° C. to a water content of 7 to 8% by weight. The extrudates were then dried overnight at room temperature before the oils were applied by vacuum coating (Dinnissen, Sevenum, the Netherlands).

Example 3

Feeding Experiments

The feeding experiments were carried out by feeding each of these formulations for a total of 12 weeks to each of three tanks containing smolts having a mean weight of 83.6 g and a total salmon weight of 4 kg per tank.

Over this period, the total salmon weight per tank increased from 4 kg to 15-17 kg per tank. In this connection, the fish consumed 8 to 11 kg of feed per tank, corresponding to a feed conversion rate (FCR) of 0.8 to 0.9 kg of feed per kg of fish.

The results of the feeding experiments are shown in the table below.

TABLE 2

Diet-dependent fish weight gain

| Diet | Final weight [g] |
|---|---|
| 1 | 331 |
| 2 | 362 |
| 3 | 339 |

Altogether, it was established that it was possible to achieve an increase in salmon growth both in the case of complete and in the case of partial replacement of the fish oil by the *Aurantiochytrium* biomass.

Interestingly, partial replacement of the fish oil by the *Aurantiochytrium* biomass achieved a higher salmon growth than complete replacement by the *Aurantiochytrium* biomass.

In this connection, it was established that the fish fed with the control formulation Diet 1, having a mean final weight of 331 g, had a distinctly lower final weight than the fish fed with the formulations Diet 1 or 2. In this connection, the fish fed with the formulation Diet 2 performed the best: they achieved a distinctly increased mean final weight of 362 g.

Example 4

Fatty Acid Utilization by the Fish

Fatty acid utilization was ascertained by lipid detection using the Bligh & Dryer extraction method and subsequent fatty acid analysis in accordance with AOCS Ce 1b-89. Both muscle samples and total salmon samples were analysed. In this connection, the results shown in the tables below were obtained (displayed in each table is the amount of ascertained fats at the start and end of the diet in grams, based in each case on 100 g of total fat).

TABLE 3

Diet-dependent fatty acid profile of salmon muscle samples

| Diet | PUFAs | Omega-3 fatty acids | DHA |
|---|---|---|---|
| Start | 41.6 | 32.7 | 22.1 |
| 1 | 31.8 | 19.0 | 10.1 |
| 2 | 35.3 | 21.7 | 14.2 |
| 3 | 38.0 | 22.8 | 16.4 |

TABLE 4

Diet-dependent fatty acid profile of total salmon samples

| Diet | PUFAs | Omega-3 fatty acids | DHA |
|---|---|---|---|
| Start | 32.5 | 22.4 | 12.5 |
| 1 | 29.9 | 17.2 | 9.0 |
| 2 | 32.6 | 18.8 | 11.5 |
| 3 | 35.2 | 19.6 | 13.1 |

It can be observed that it was already possible to achieve a distinct increase in the content of PUFAs, omega-3 fatty acids and DHA in the case of partial replacement of the fish oil by the *Aurantiochytrium* biomass. In the case of complete replacement of the fish oil by the *Aurantiochytrium* biomass, the increase in the content of PUFAs was accordingly higher.

Example 6

Determining the Fat Content in Salmon Liver

Each of 3 smolts were fed for 9 weeks in each case with the different formulations Diet 1, 2 and 3 and the livers of the salmons were subsequently removed for determination of the fat content. Fat was extracted according to the method by Folch (1957; J. Biol. Chem., 226 (1), 497-509). Fat content was then determined by a gravimetric method.

It became apparent that it was possible to significantly reduce the fat content in the liver from 8% by weight to 4-5% by weight by virtue of the presence of the biomass in comparison with feeding without the biomass.

Fat deposition in the liver is considered to be a sign of an imbalance in food metabolism and, in particular, also an indication of oxidative stress. The distinct reduction in the proportion of fat in the liver is thus a clear indication of the reduction of stress and thus of the improvement in the physical condition of the salmon.

The invention claimed is:

1. A fish feedstuff comprising an *Aurantiochytrium* or *Schizochytrium* biomass in an amount of 7 to 20% by weight of the feedstuff, fish oil in an amount of 4 to 11% by weight of the feedstuff and fish meal in an amount of 5 to 25% by weight of the feedstuff, wherein, when fish are fed a diet of said feedstuff, the fish exhibit an increase in body weight and growth.

2. The feedstuff of claim 1, wherein the biomass comprises cells from the species *Aurantiochytrium limacinum*.

3. The feedstuff of claim 2, wherein the cells are from the strain *Aurantiochytrium limacinum* SR21.

4. The feedstuff of claim 1, wherein said feedstuff has a total protein content of 40 to 50% by weight of the feedstuff and a total fat content of 22 to 28% by weight of the feedstuff.

5. The feedstuff of claim 1, wherein said feedstuff contains omega-3 fatty acids in a total amount of 2.0 to 4.0% by weight of the feedstuff.

6. The feedstuff of claim 5, wherein said fish meal is present in an amount of 10-20% by weight of the feedstuff.

7. The feedstuff of claim 1, wherein said fish meal is present in an amount of 12-18% by weight of the feedstuff.

8. The feedstuff of claim 1, wherein said fish oil is present in an amount of 4 to 8% by weight of the feedstuff.

9. The feedstuff of claim 1, wherein said fish oil is present in an amount of 4 to 6% by weight of the feedstuff.

10. The feedstuff of claim 7, wherein said fish oil is present in an amount of 4 to 6% by weight of the feedstuff.

11. The feedstuff of claim 9, wherein the biomass is present at 7-11% by weight of the feedstuff.

12. The feedstuff of claim 1, wherein the biomass is present at 7-11% by weight of the feedstuff.

13. The feedstuff of claim 1, wherein:
    a) said biomass is present at 7-11% by weight of the feedstuff;
    b) said fish meal is present in an amount of 10-20% by weight of the feedstuff;
    c) said fish oil is present in an amount of 4 to 8% by weight of the feedstuff.

14. The feedstuff of claim 13, wherein said feedstuff has a total protein content of 40 to 50% by weight of the feedstuff, a total fat content of 22 to 28% by weight of the feedstuff and a total omega-3 fatty acid content of 2.0 to 4.0% by weight of the feedstuff.

15. A method for farming fish, comprising feeding said fish the feedstuff of claim 1.

16. The method of claim 15, wherein the feedstuff has a total protein content of 40 to 50% by weight of the feedstuff and a total fat content of 22 to 28% by weight of the feedstuff.

17. The method of claim 15, wherein the feedstuff contains omega-3 fatty acids in a total amount of 2.0 to 4.0% by weight of the feedstuff.

18. The method of claim 15, wherein the feedstuff comprises:
 a) 7-11% biomass by weight of the feedstuff;
 b) 10-20% fish meal by weight of the feedstuff;
 c) 4 to 8% fish oil by weight of the feedstuff.

19. The method of claim 15, wherein the increase in body weight and growth exhibited by fish when fed a diet of the feedstuff is greater than when the fish are fed a diet of the feedstuff which comprises said fish oil but not *Aurantiochytrium* or *Schizochytrium* biomass or which comprises said *Aurantiochytrium* or *Schizochytrium* biomass but not said fish oil, and wherein these feedstuffs all have the same fat content.

* * * * *